(12) United States Patent
Cros et al.

(10) Patent No.: US 9,401,094 B2
(45) Date of Patent: Jul. 26, 2016

(54) METHOD FOR ASSISTING THE PILOTING OF AN AIRCRAFT ON THE GROUND AND SYSTEM FOR ITS IMPLEMENTATION

(71) Applicant: Airbus (SAS), Blagnac (FR)

(72) Inventors: Christophe Cros, L'Union (FR); Vincent Loubiere, Toulouse (FR); Alexandre Godin, Brax (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 14/790,574

(22) Filed: Jul. 2, 2015

(65) Prior Publication Data

US 2016/0005319 A1   Jan. 7, 2016

(30) Foreign Application Priority Data

Jul. 7, 2014 (FR) ...................... 14 56514

(51) Int. Cl.
| | |
|---|---|
| *G08G 5/04* | (2006.01) |
| *G08G 5/06* | (2006.01) |
| *H04N 5/232* | (2006.01) |
| *G06K 9/46* | (2006.01) |
| *H04N 5/247* | (2006.01) |
| *B64D 47/08* | (2006.01) |

(Continued)

(52) U.S. Cl.
CPC ............... *G08G 5/045* (2013.01); *B64D 47/08* (2013.01); *G02B 27/017* (2013.01); *G06F 3/0383* (2013.01); *G06K 9/00791* (2013.01); *G06K 9/46* (2013.01); *G06T 15/20* (2013.01); *G06T 19/006* (2013.01); *G08G 5/0021* (2013.01); *G08G 5/065* (2013.01); *H04N 5/23238* (2013.01); *H04N 5/23293* (2013.01); *H04N 5/247* (2013.01); *H04N 7/18* (2013.01); *G02B 2027/0178* (2013.01)

(58) Field of Classification Search
CPC ....... G08G 5/045; G08G 5/065; H04N 5/247; H04N 5/23238; H04N 5/23293; B64D 47/08; G06T 15/20; G06T 19/006; G06F 3/0383; G02B 27/017; G02B 2027/0178; G06K 9/46
USPC ............................................................ 701/3
See application file for complete search history.

(56) References Cited

U.S. PATENT DOCUMENTS

| | | | |
|---|---|---|---|
| 6,405,975 | B1 | 6/2002 | Sankrithi et al. |
| 2010/0123599 | A1 | 5/2010 | Hamza et al. |

(Continued)

FOREIGN PATENT DOCUMENTS

| | | |
|---|---|---|
| EP | 0980828 | 2/2000 |
| EP | 2187372 | 5/2010 |
| EP | 2495168 | 9/2012 |

OTHER PUBLICATIONS

French Search Report, Dec. 17, 2014.

*Primary Examiner* — McDieunel Marc
*Assistant Examiner* — James E Stroud
(74) *Attorney, Agent, or Firm* — Greer, Burns & Crain, Ltd.

(57) ABSTRACT

A method for assisting the piloting of an aircraft on the ground comprises the steps of obtaining a panoramic view of at least one area adjacent to the aircraft, isolating an image corresponding to a part of the panoramic view and which is selected according to an orientation desired by the pilot, and displaying the image on a display device visible by the pilot. A system for the implementation of the method is also provided.

11 Claims, 2 Drawing Sheets

(51) Int. Cl.
    *G06F 3/038*   (2013.01)
    *G02B 27/01*   (2006.01)
    *G06T 19/00*   (2011.01)
    *G06T 15/20*   (2011.01)
    *G06K 9/00*    (2006.01)
    *G08G 5/00*    (2006.01)
    *H04N 7/18*    (2006.01)

(56) References Cited

U.S. PATENT DOCUMENTS

2012/0224058 A1   9/2012   Benning et al.
2014/0081567 A1   3/2014   Kirk et al.
2014/0092206 A1   4/2014   Boucourt et al.

METHOD FOR ASSISTING THE PILOTING OF AN AIRCRAFT ON THE GROUND AND SYSTEM FOR ITS IMPLEMENTATION

RELATED APPLICATIONS

The present application is based on, and claims priority from French application number FR1456514, filed Jul. 7, 2014, the disclosure of which is hereby incorporated by reference herein in its entirety.

FIELD OF THE INVENTION

The present invention relates to a method for assisting the piloting of an aircraft on the ground as well as to a system for its implementation.

BACKGROUND OF THE INVENTION

During the taxiing phases which precede takeoff or which follow landing, the pilot steers the aircraft by following a path, generally materialized by a line painted on the ground. During these taxiing phases, the pilot must avoid moving outside of the taxiways so as not to take the risk of getting bogged down or stuck in the verges.

The path followed by the pilot generally comprises changes of direction which are difficult maneuvers to carry out because the pilot has a reduced field of vision through the windscreen of the aircraft and because this field of vision is distant from the position of the wheels of the aircraft.

Thus, when the pilot observes a change of direction through the windscreen, he must wait before initiating the corresponding change of direction control and he must delay this control in time in such a way that the wheels follow the path correctly. Generally, when the pilot initiates the change of direction control, he can no longer see the portion of the path which includes this change of direction.

The time delay of the change of direction control varies from one aircraft to another, notably as a function of the dimensions of the aircraft.

Although the pilot has a maneuvering margin for small-sized aircraft, this margin is reduced for large-sized aircraft and a trajectory deviation can lead to an exit from the taxiway if the latter is narrow.

SUMMARY OF THE INVENTION

The purpose of the present invention is therefore to provide a way of assisting the pilot during maneuvers of the ground.

For this purpose, the invention relates to a method for assisting the piloting of an aircraft on the ground, characterized in that it comprises the steps provided for:

obtaining a panoramic view of at least one area adjacent to the aircraft, isolating an image which corresponds to a part of the panoramic view and which is selected according to an orientation desired by the pilot, and displaying the image on a display device visible by the pilot.

The method for assisting piloting on the ground provides the pilot, on a single screen, with a field of vision making it possible to display the environment of the aircraft, more particularly the taxiway close to the landing gear. The method also allows the pilot to focus his attention on very specific area which is displayed in detail on the display device. In this way the pilot can better estimate the distance separating the aircraft from an obstacle or from a verge.

According to a variant, the method comprises a step of detection of an obstacle from the panoramic view, such as for example a verge, and of emission of a signal if the distance separating the aircraft and the detected obstacle is less than a given value.

According to another variant, the method comprises a step of reconstitution of the panoramic view from several views captured by several cameras.

The invention also relates to a system for assisting the piloting of an aircraft on the ground, characterized in that it comprises:

at least one image acquisition device, integral with the aircraft, configured to capture a panoramic view or views making it possible to reconstitute a panoramic view of at least one area adjacent to the aircraft, a display device, a pointer making it possible to indicate an orientation, at least one image processing device which, from the panoramic view, isolates an image as a function of the orientation indicated by the pointer, the said image being displayed on the display device.

Advantageously, the display device is mobile and the pointer comprises an orientation sensor connected to the display device and configured to indicate the orientation of the display device to the image processing device.

According to one embodiment, the display device is an immersive helmet or immersive glasses.

According to another embodiment, the display device is a tablet.

Advantageously, the image acquisition device is positioned under the fuselage of the aircraft in an area where the wings join the fuselage.

According to another feature, the image acquisition device is adjustable in orientation and/or in focus.

According to one embodiment, the image acquisition device is static and positioned inside a transparent cowl protruding with respect to the fuselage of the aircraft.

According to another alternative embodiment, the image acquisition device is mobile between a retracted position in which it is disposed inside the fuselage and a second deployed position in which it is disposed outside of the fuselage.

Preferably, the system for assisting piloting on the ground comprises at least one collision sensor and/or one line detection sensor.

BRIEF DESCRIPTION OF THE DRAWINGS

Other features and advantages will become apparent from the following description of the invention, given solely by way of example and with reference to the appended drawings in which.

DETAILED DESCRIPTION OF THE PREFERRED EMBODIMENTS

Figure 1:
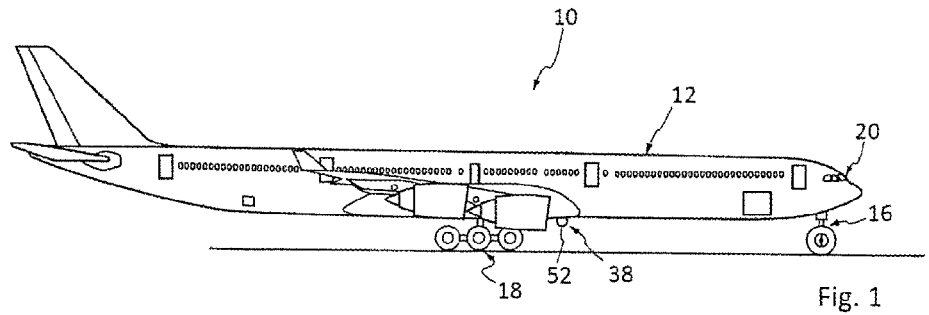
FIG. 1 is a side view of an aircraft moving on the ground which illustrates the invention.

In the different figures, there has been shown an aircraft 10 which comprises a fuselage 12, a right wing 14, a left wing 14', a front landing gear 16 disposed at the front of and below the fuselage 12, a right rear landing gear 18 disposed under the right wing 14 and a left rear landing gear (not visible) disposed under the left wing 14'.

Figure 4:
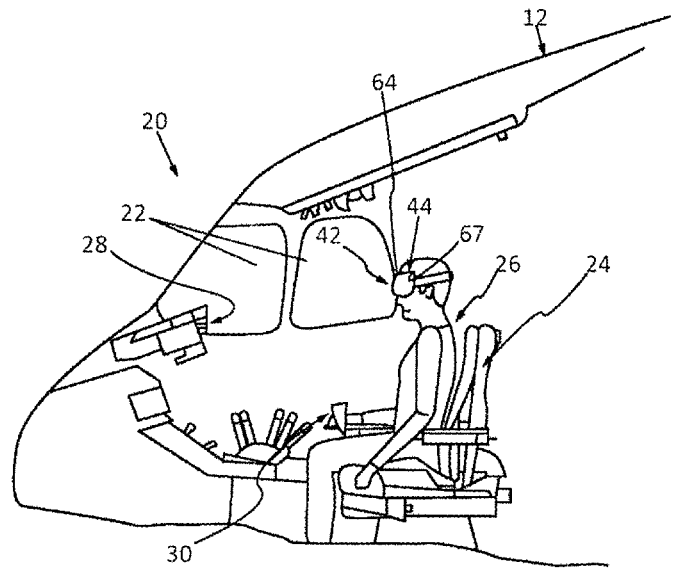
FIG. 4 is a side view of a cockpit in which is positioned a pilot equipped with a display device according to a variant of the invention.

As shown in FIG. 4, the aircraft 10 also comprises a cockpit 20, disposed at the front of the fuselage 12, which comprises at least one windscreen 22 and a piloting position 24 in which a pilot 26 is positioned.

The windscreen 22 provides the pilot with a more or less restricted field of view of the environment outside of the aircraft.

The piloting position 24 comprises a least one display screen 28 and at least one trajectory control device 30.

On the ground, the aircraft 10 moves on at least one track 32, such as a runway or a taxiway for example, bordered by verges 34, 34' which can be soft.

During a taxiing phase, the pilot 26 operates the trajectory control device 30 in order to modify the orientation of the aircraft 10, and more particularly of the front landing gear 16, in order to follow a path and to keep the landing gear 16, 18 on the taxiway 32.

Advantageously, the taxiway 32 comprises a marking 36, such as for example a line, which represents the ideal path that the aircraft 10 must follow in order that the landing gear 16, 18 remain on the taxiway 32. From his piloting position 24, the pilot 26 can only see through the windscreen 22 a portion of the marking 36, this portion being distant in front of the aircraft.

According to the invention, the aircraft 10 comprises a system for assisting piloting on the ground which comprises:
at least one image acquisition device 38, integral with the aircraft 10, configured to capture a panoramic view or views 40 making it possible to reconstitute a panoramic view of at least one area adjacent to the aircraft,
a display device 42,
a pointer 44 making it possible to indicate an orientation,
at least one image processing device 46 which, from the panoramic view, isolates an image 48 as a function of the orientation indicated by the pointer 44, the said image 48 being displayed on the display device 42.

A panoramic view has a camera angle of greater than 150° in a horizontal plane. For the present application, "view" or "image" means a single view or a single image or a sequence of views or of images which is also called a "film" or a "video."

Advantageously, the panoramic view shows a part of the taxiway close to at least one landing gear of the aircraft.

According to a first embodiment, the image acquisition device 38 is a spherical video camera 50 comprising several lenses, such as for example a camera marketed under the name "Ladybug 2" by the "Point Grey" company.

According to another embodiment, the image acquisition device 38 comprises several cameras distributed over different areas of the fuselage 10. According to a first case, the image acquisition device 38 comprises image processing in order to reconstitute a panoramic view from the views 40 captured by the different cameras, this reconstituted panoramic view being transmitted to the image processing device 46. According to a second case, the image acquisition device 38 transmits the views 40 captured by the different cameras to the image processing device 46 which reconstitutes a panoramic view.

According to another embodiment, the image acquisition device 38 comprises a camera and at least one mirror which comprises a surface whose shape is configured in order to obtain a panoramic view which is captured by the camera and which is then transmitted to the image processing device 46.

According to another embodiment, the image acquisition device 38 comprises at least one camera with a wide angle lens.

Advantageously, the panoramic view captured by the image acquisition device 38 or reconstituted by the image acquisition device 38 and/or the image processing device 46 is a cylindrical panoramic view with a vertical axis or a spherical panoramic view. As a variant, the panoramic view extends over a portion of cylinder or a portion of sphere.

According to an improved variant, the image acquisition device 38 is adjustable in orientation and/or in focus. For this purpose, the image acquisition device 38 comprises at least one orientation control for adjusting the shooting orientation of the image acquisition device 38 and at least one focus control for adjusting the focal distance of the image acquisition device 38. These controls are preferably remotely controllable.

The image acquisition device 38 can be disposed at different places on the outer surface of an aircraft.

According to a first embodiment, the image acquisition device 38 comprises a camera placed on a landing gear.

According to another embodiment, the image acquisition device 38 comprises several cameras placed on the different landing gear.

According to another embodiment, the image acquisition device 38 comprises at least one camera placed on the airfoils and/or the stabilizing surfaces. For example, a camera placed under the end of each wing and another camera placed at the level of the tailplane.

According to another embodiment shown in FIG. 1, the image acquisition device 38 comprises a camera positioned under the fuselage 12, in the area of junction between the wings and the fuselage called the hull. This position is prioritized because it provides visibility in all directions. Moreover, this position is centered with respect to the ends of the wings.

The invention is not however limited to these various areas of installation.

According to a first configuration shown in FIG. 1, the image acquisition device 38 is static and positioned inside a transparent cowl 52 protruding with respect to the fuselage of the aircraft. This cowl 52 has shapes designed to reduce aerodynamic interference.

Figure 3:
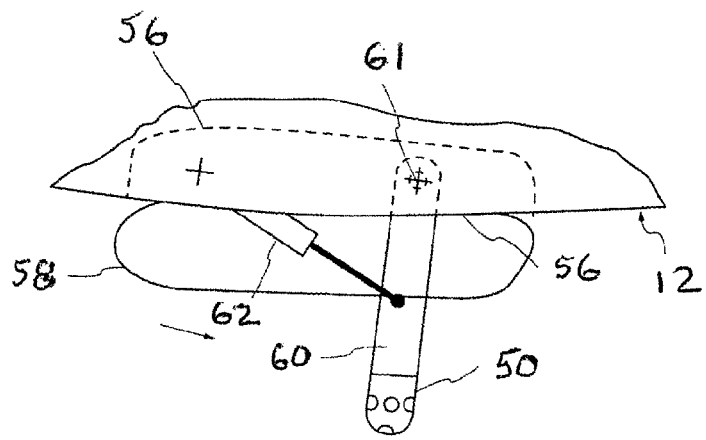
FIG. 3 is a side view of an image acquisition device which illustrates a variant of the invention.

According to a second configuration shown in FIG. 3, the image acquisition device 38 is mobile between a retracted position in which it is disposed inside the fuselage 12 and a second deployed position in which it is disposed outside of the fuselage 12.

According to one embodiment, the fuselage of the aircraft comprises:
an opening 54 which connects a housing 56 (disposed inside the fuselage) with the outside of the fuselage,
a hatch 58 movable between a closed position in which the hatch 58 is disposed flush with the fuselage and covers the opening 54 and an open position in which it uncovers the opening 54.

The aircraft additionally comprises:
a mast 60 with a first end connected by a hinge 61 to the rest of the aircraft, the image acquisition device 38 (more particularly the spherical video camera 50) being fixed to the other end of the mast 60,
an actuator 62 configured to move the mast 60 between a retracted position in which the mast 60 is disposed inside the housing 56 so as to allow the hatch 58 to be in the closed position and a deployed position in which at least a part of the mast 60, notably the part supporting the image acquisition device 38, protrudes with respect to the fuselage 12, as shown in FIG. 3.

According to this second configuration, the mast is disposed in the deployed position only during the taxiing phases. Thus, during the flight phases, the image acquisition device 38 is disposed inside the fuselage and does not generate any aerodynamic disturbance.

The number of cameras of the image acquisition device 38 and/or their locations can vary from on aircraft to another. They are determined in such a way as to obtain a compromise between a panoramic view that is as complete as possible without shaded areas and the complexity and cost of installation.

According to a variant shown in FIG. 4, the display device 42 comprises a screen supported by the head of the pilot 26. According to one embodiment, the display device 42 is an immersive helmet 64 or immersive glasses. In the case of an immersive helmet, the pilot is isolated from his environment. However, his environment can be reproduced totally or partially inside the immersive helmet 64. In the case of immersive glasses, the pilot sees his environment directly as with spectacles, the image 48 being projected in front of him without hiding the environment.

Figure 5:
FIG. 5 is a perspective view of a display device according to another variant of the invention.

According to another variant shown in FIG. 5, the display device 42 is a mobile tablet 66. This tablet 66 can be dedicated exclusively to the method for assisting piloting on the ground or it can be used for other applications by the pilot.

According to another variant, the display device 42 is a screen already present in the cockpit, such as for example the display screen 28.

According to a first variant, the pointer 44 is a device or software making it possible to identify a control by the pilot 26.

According to one embodiment, the pointer 44 is a controller of the joystick type which is used for indicating at least an orientation according to the orientation of the joystick. This joystick can be used for identifying other controls such as for example a focus control as previously mentioned.

According to another embodiment, a touch screen, notably that of the tablet 66, is used as a pointer 44 for indicating at least one orientation and possibly for other controls, for example a focus control as previously mentioned.

Advantageously, when the display device 42 is mobile, the pointer 44 comprises an orientation sensor 67 attached to the display device 42. Thus, by moving the display device 42, the pilot 26 automatically indicates the orientation he desires and in doing so the area of the panoramic view from which the image 48 displayed on the display device 42 must be extracted. In the case of an immersive helmet 64 or of immersive glasses, the pilot 26 indicates the desired orientation by turning his head. In the case of a tablet 66, the pilot 26 indicates the desired orientation by turning the tablet 66.

The orientation sensor 67 and more generally the pointer 44 indicates to the image processing device 46, by means of a wired or wireless link, the orientation of the display device 42. The image processing device 46 isolates, in the panoramic view 68, the image 48 corresponding to the orientation of the display device 42 which corresponds to the orientation chosen by the pilot 26.

The image processing device 46 comprises at least one software application implemented in a computer dedicated to the method for assisting piloting on the ground or in a computer already existing in the aircraft.

Figure 6:
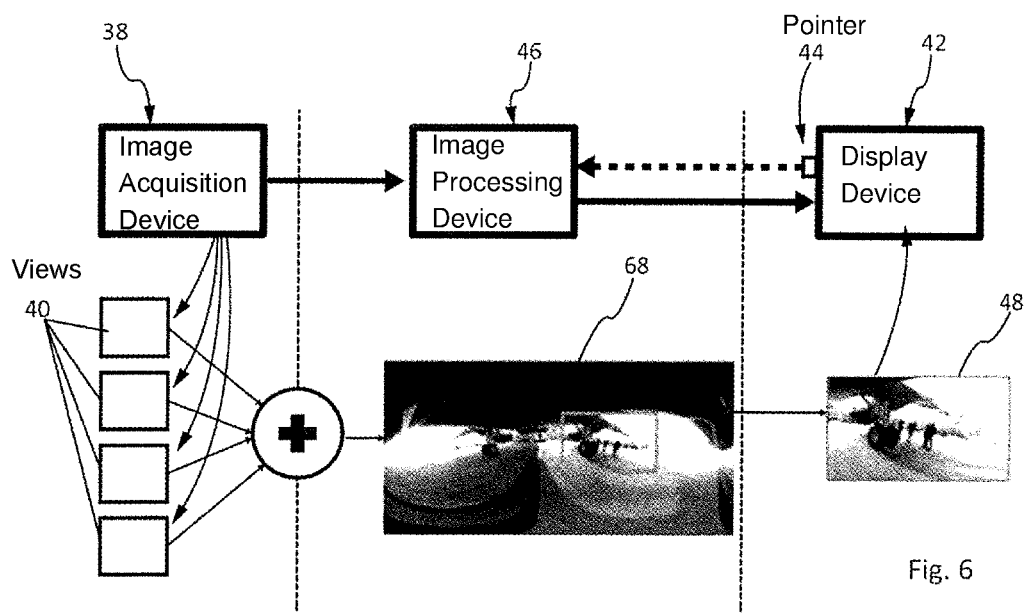
FIG. 6 is a diagram of a method for assisting piloting on the ground which illustrates the invention.

As shown in FIG. 6, the software application makes it possible, from a panoramic view 68 and an orientation indicated by the pointer 44, to isolate an image 48 which corresponds to a part of the panoramic view 68 which is selected as a function the orientation indicated by the pointer 44.

According to the variants, the software application reconstitutes the panoramic image 68 as a function of the views 40 captured by the image acquisition device 38 when the latter comprises several cameras.

According to the invention, the method for assisting the piloting of an aircraft on the ground comprises the steps aimed at obtaining a panoramic view 68 of at least one area adjacent to the aircraft, notably the part of the taxiway close to the aircraft, and at isolating an image 48 which corresponds to a part of the panoramic view 68 which is selected as a function of an orientation chosen by the pilot and at displaying the image 48 on a display device visible by the pilot.

The method for assisting piloting on the ground provides the pilot, on a single screen, with a field of view making it possible to display the environment of the aircraft and more particularly the taxiway close to the landing gear. Moreover, by means of the pointer 44, he can focus his attention on a very precise area which is displayed in detail on the display device 42. In this way, the pilot can better estimate the distance that separates the aircraft from an obstacle or from a verge.

The system for assisting piloting on the ground comprises a first wired or wireless link between the image acquisition device 38 and the image processing device 46 and a second wired or wireless link between the image processing device 46 and the display device 42.

According to another variant, the image acquisition device 38 comprises at least one IR (InfraRed) or UV (UltraViolet) camera. This configuration makes it possible to use the method for assisting piloting on the ground even in the case of poor visibility, for example at night or in the presence of fog.

According to other configurations, the image processing device 46 comprises an image recognition application capable of identifying, from the panoramic view, the verges 34, 34' of a taxiway and of emitting a signal if the distance separating one of the landing gear 16, 18 and one of the verges 34, 34' is less than a given value. More broadly, this image recognition application is configured to recognize a possible obstacle and to emit a signal if this possible obstacle is positioned in a given area.

Figure 2:
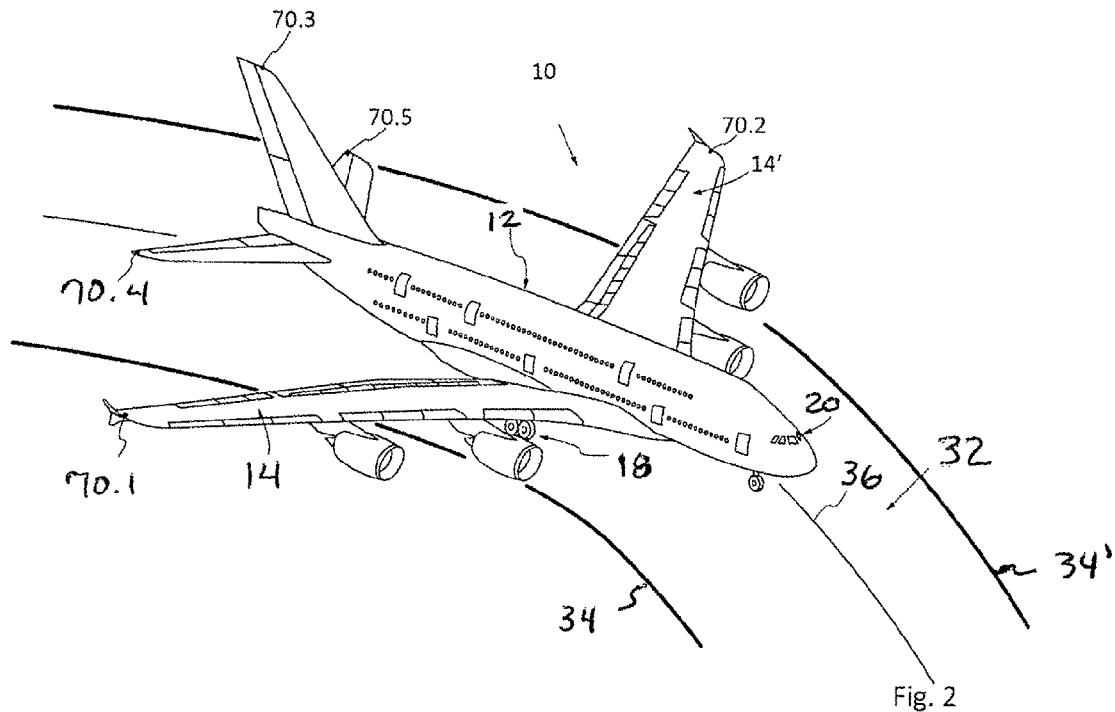
FIG. 2 is a perspective view of an aircraft moving on a taxiway which illustrates the invention.

According to another embodiment, the device for assisting piloting on the ground comprises at least one collision sensor which makes it possible to detect the approach of an obstacle. According to a configuration shown in FIG. 2, the device for assisting piloting on the ground comprises a collision sensor 70.1, 70.2 at the end of each wing, a collision sensor 70.3 at the top end of the fin and/or a collision sensor 70.4, 70.5 at the end of each horizontal stabilizer of the tailplane.

According to another embodiment, the device for assisting piloting on the ground comprises at least one sensor for detecting a line such as the marking 36 or a line of demarcation between the taxiway and a verge.

In the presence of at least one collision sensor and/or of at least one sensor for detecting a line, the method for assisting piloting on the ground emits a signal which can be visual or audible when at least one of the said sensors identifies a risk, for example the approach of an obstacle or of the line of demarcation between the taxiway and one of the verges or a distance from the marking 36 that is too great.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the piloting of an aircraft on the ground, comprising:
   obtaining a panoramic view of at least one area adjacent to the aircraft,
   indicating an orientation of a mobile display device using a pointer having an orientation sensor connected to the mobile display device,
   indicating the orientation of the mobile display device to an image processing device,
   using the image processing device, isolating an image which corresponds to a part of the panoramic view as a function of the orientation indicated by the pointer, and
   displaying the isolated image on the mobile display device based on the orientation indicated by the pointer,
   wherein an orientation of the image displayed on the display device is independent of the orientation of the display device.

2. The method according to claim 1, further comprising detecting an obstacle from the panoramic view, and emitting a signal if a distance separating the aircraft and the detected obstacle based on a predetermined value.

3. The method according to claim 1, further comprising reconstituting the panoramic view from a plurality of views captured by at least one camera.

4. A system for assisting the piloting of an aircraft on the ground, the aircraft comprising a fuselage, wings and landing gear, the system comprising:
   at least one image acquisition device, attached to the aircraft, and configured to generate a panoramic or reconstituted panoramic view of at least one area adjacent to the aircraft,
   a mobile display device,
   a pointer constructed and arranged for indicating an orientation of the mobile display device and including an orientation sensor connected to the mobile display device, and configured to indicate the orientation of the mobile display device to an image processing device, and
   wherein the image processing device, from the panoramic or reconsititued panoramic view, is configured to isolate an image as a function of the orientation indicated by the orientation sensor, and the isolated image is displayed on the display device based on the orientation indicated by the orientation sensor.

5. The system according to claim 4, wherein the mobile display device includes at least one of: an immersive helmet and immersive glasses.

6. The system according to claim 4, wherein the mobile display device includes a tablet.

7. The system according to claim 4, wherein the image acquisition device is disposed under the fuselage of the aircraft in an area where the wings join the fuselage.

8. The system according to claim 4, wherein the image acquisition device is adjustable in at least one of: orientation and focus.

9. The system according to claim 4, wherein the image acquisition device is static and disposed inside a transparent cowl protruding with respect to the fuselage of the aircraft.

10. The system according to claim 4, wherein the image acquisition device is mobile between a first retracted position inside the fuselage and a second deployed position outside of the fuselage.

11. The system according to claim 4, further comprising at least one of: a collision sensor and a line detection sensor.

* * * * *